J. W. LEDOUX.
LIQUID METER.
APPLICATION FILED DEC. 9, 1909.
1,033,598.
Patented July 23, 1912.
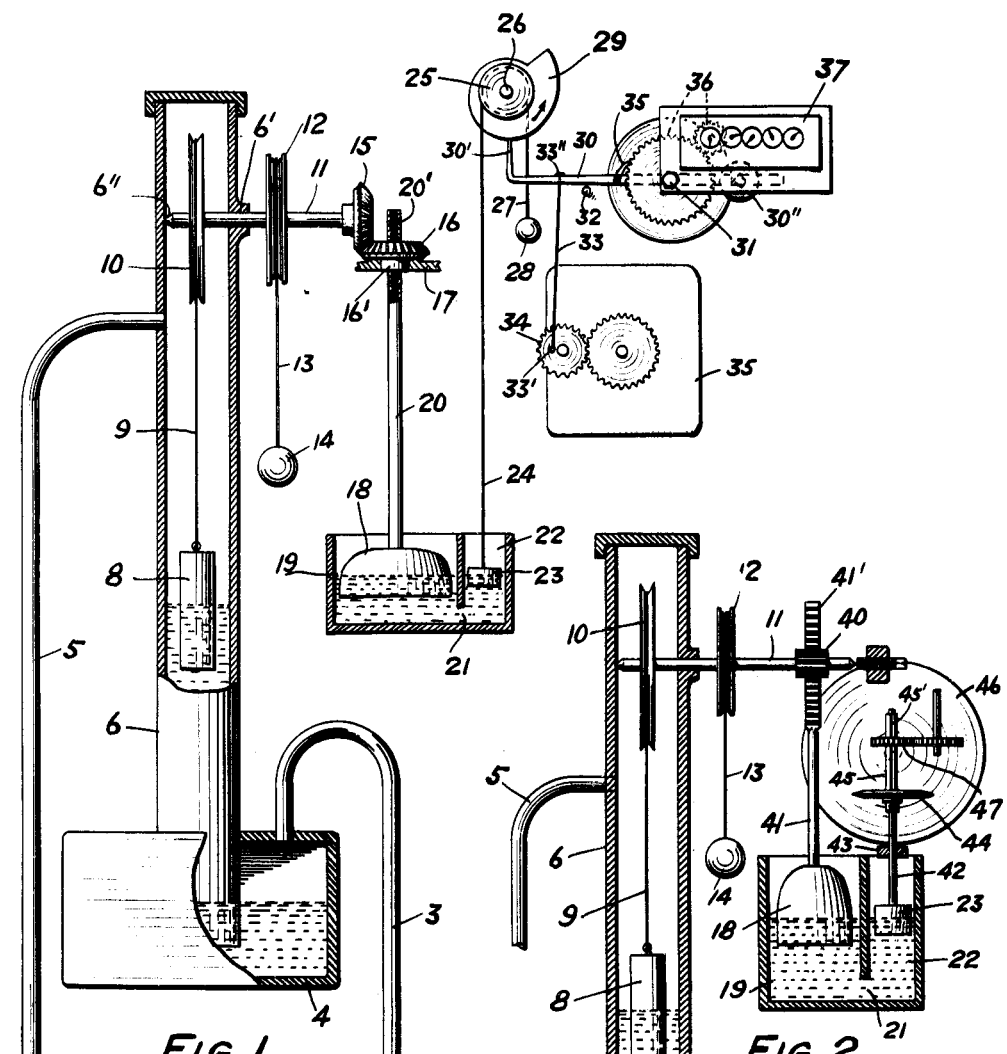
FIG. 1.
FIG. 2.
WITNESSES:
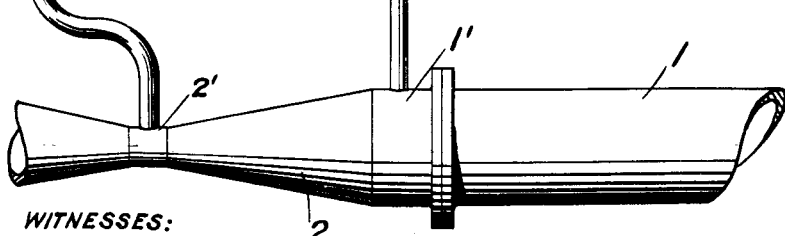
INVENTOR
John W. Ledoux
BY
Charles N. Butler
ATTORNEY.

UNITED STATES PATENT OFFICE.

JOHN W. LEDOUX, OF SWARTHMORE, PENNSYLVANIA.

LIQUID-METER.

1,033,598.  Specification of Letters Patent.  Patented July 23, 1912.

Application filed December 9, 1909. Serial No. 532,180.

*To all whom it may concern:*

Be it known that I, JOHN W. LEDOUX, a citizen of the United States, residing at Swarthmore, in the county of Delaware and State of Pennsylvania, have invented certain Improvements in Liquid-Meters, of which the following is a specification.

My invention is a meter having improved means for differentiating liquid pressures and integrating the flow thereof.

In the preferred construction of my invention, liquid is displaced by a device so shaped and operated that its movement, as also the movements of coördinated parts, due to differential pressures exerted thereon by a flowing liquid, will be a simple proportion of the rate of flow.

The nature of my improvements is fully disclosed in the following description and the accompanying drawings in illustration thereof.

In the drawings, Figure 1 is a sectional elevation of apparatus embodying my improvements, and Fig. 2 is a sectional elevation representing modifications in the construction of the apparatus.

In the form of the apparatus shown in Fig. 1, the conduit 1, provided with the Venturi section 2, has its normal section 1' connected by a tube 3 with the top of a closed mercury reservoir 4 and the throat 2' of the Venturi section connected by a tube 5 with the top of a stand pipe 6 which extends through the top of the reservoir to a point near its bottom, the top of the stand pipe being closed and its bottom being open. A cylindrical float 8 is immersed, to a greater or less extent, in the mercury contained in the chamber 6 and is connected by a cord 9 with a sheave 10, fixed, within the chamber 6, on a shaft 11, which is journaled in the bearings 6' and 6''. A sheave 12 is fixed to the shaft 11, exterior to the chamber 6, and has connected therewith, by a cord 13, the counter-poise 14 for balancing the float 8. A beveled gear 15 is fixed on the shaft 11 and meshes with a beveled gear 16 having the hub 16' journaled in the bearing 17. A liquid displacing device 18, immersed to a greater or less extent in mercury contained in the chamber 19, has a stem 20 with a thread 20' thereon with which the gear 16 engages. The chamber 19 communicates, by a passage 21, with a chamber 22. A float 23 rides in the mercury contained in the chamber 22 and is connected by a cord 24 with a revoluble sheave 25 carried by the shaft 26. A cord 27 connects a counter-poise 28 with the sheave 24 to counter-balance the float 23. A cam 29 is fixed relative to and revolves with the sheave 25, and a tappet 30' makes contact with the periphery of the cam, the tappet being carried by a lever 30 on the fulcrum 31 and thrown into contact with the cam by the weighted lever arm 30''. The tappet is withdrawn from the cam, against the stop 32, regularly, by a rod 33 having an eccentric connection 33' with the gear 34 of a clock 35, the rod moving upwardly through the lever and having a head 33'' for engaging therewith to withdraw the tappet. The lever 30 acts through a pawl 35 carried thereby on a gear train 36 which operates the register 37.

When there is no flow in the conduit 1, the mercury and the float 8 will be at their lowest positions in the chamber 6, the device 18 will be submerged so that its top is level with the surface of the mercury containing it, the mercury in the chamber 22 and the float 23 will be in their highest positions, the point of the cam 29 having the longest radius vector will have contact with the tappet 30', the lever 30 will be held in engagement with the stop 32 and the register 37 will be inactive. As the flow in the conduit 1 increases, the differential pressures communicated through the conduits 3 and 5 to the chambers 4 and 6 causes the mercury and the float 8 to rise in the chamber 6. The rising float 8 permits the weight 14 to revolve the shaft 11 and the engaging gears 15 and 16. The gear 16 acts on the thread 20' to elevate the rod 20 and lift the device 18, which results in the fall of the mercury and the float 23 in the chamber 22 and the revolution of the cam 29 in the direction of the arrow thereon. The arm 30 is now permitted to rise so that it can be oscillated through an arc which is a function of the distance the floats and the cam have been moved, which due to the shape of the part 18, is a simple proportion of the change in the rate of flow in the conduit 1, and the register 37 is caused to integrate the flow.

In the modified form of the apparatus shown in Fig. 2, the shaft 11 has fixed thereon a pinion 40 and the float 18 has a stem 41 provided with a rack 41' which engages the pinion. The float 23 has a stem 42 which is movable longitudinally through the guide 43. A disk 44 has a sleeve 45 which is revoluble on the shaft 42 and movable thereby to and from the axis of the disk 46 which revolves at a regular rate. The sleeve 45 has a feather 45' which engages and revolves the register gear 47 through which the sleeve is movable. When there is no flow in the conduit 1, the mercury and the float 8 will occupy their lowest positions in the chamber 6, the float 18 will be submerged with its top level with the surface of the mercury in the chamber 19, and the mercury in the chamber 22 will elevate the float 23 so that the disk 44 will make contact with the center of the disk 46. In this position of the mechanism the register is inactive. As the flow increases in the conduit 1, the mercury and float 8 rise in the chamber 6 and the weight 14 acts through the cord 13 on the sheave 12 to revolve the shaft 11 and the pinion 40, which acts through the rack 41' and stem 41 to elevate the float 18. The mercury and the float 23 now fall in the chamber 22 and the disk 44 is withdrawn from the center of the disk 46 a distance which is a function of the rate of flow. The revolutions of the disk 44, which are a function of the flow, are integrated by the register and the volume of flow determined.

Having described my invention, I claim:

1. In a liquid meter, a liquid chamber, a float in said chamber, a pair of communicating chambers, a float in one of said communicating chambers, a liquid displacing device in the other of said communicating chambers, and mechanism movable by means of said float first named for moving said displacing device.

2. In a liquid meter, means comprising a device movable by varying pressures, a pair of communicating liquid chambers, a displacing device adapted to be submerged to different depths in liquid in one of said chambers, mechanism whereby said device first named operates said displacing device, a device movable by means of the liquid in the second of said chambers, integrating mechanism and means whereby said last named device controls the operation of said integrating mechanism.

3. In a liquid meter, means comprising a device movable by varying pressures, a pair of communicating liquid chambers, a tapered displacing device adapted to be submerged to different depths in liquid in one of said chambers, mechanism whereby said first named device varies the submergence of said tapered device, a device movable by the liquid in the second of said communicating chambers, integrating mechanism, and means whereby said last named device controls the operation of said integral mechanism.

4. In a liquid meter, in combination with a liquid conduit, a liquid chamber, means whereby differential pressures are communicated from said conduit to said chamber and, the liquid height in said chamber is varied, a device in said chamber movable by changes in said liquid height, a pair of communicating liquid chambers, a device movable in each of said communicating chambers, means whereby said first device moves a device in one of said communicating chambers to change the height of liquid and the device in the second communicating chamber, integrating mechanism, and means whereby said last named device controls the operation of said integrating mechanism, one of said devices being tapered so that the elevation of said last named device shall be a simple proportion of the rate of flow in said conduit.

In witness whereof I have hereunto set my name this 6th day of December, 1909, in the presence of the subscribing witnesses.

JOHN W. LEDOUX.

Witnesses:
ROBERT JAMES EARLY,
C. N. BUTLER.